United States Patent [19]
Sharpe

[11] Patent Number: 5,456,074
[45] Date of Patent: Oct. 10, 1995

[54] METHOD FOR UNWRAPPING SUBCONDUCTORS

[76] Inventor: Robert F. Sharpe, 2141 Fort Rice St., Petersburg, Va. 23805

[21] Appl. No.: 246,465

[22] Filed: May 18, 1994

Related U.S. Application Data

[63] Continuation of Ser. No. 892,116, Jun. 2, 1992, abandoned.

[51] Int. Cl.⁶ .................................................. H02G 1/08
[52] U.S. Cl. ........................... 57/1 UN; 57/2.3; 57/362; 254/134.3 PA; 254/395; 254/388
[58] Field of Search ............................ 57/1 UN, 2.3, 57/2.5, 362; 254/134.3 PA, 395, 388

[56] References Cited

U.S. PATENT DOCUMENTS

| | | | |
|---|---|---|---|
| 1,091,089 | 3/1914 | Steele | 254/388 |
| 1,299,213 | 4/1919 | Nick | 254/134.3 PA |
| 1,450,430 | 4/1923 | Cornell . | |
| 1,589,776 | 6/1926 | Warden | 254/395 |
| 2,597,628 | 5/1952 | Fecenchak | 254/388 |
| 3,077,337 | 2/1963 | Cronkright | 254/134.3 PA |
| 3,098,638 | 7/1963 | McAuley | 254/134.3 PA |
| 3,437,314 | 8/1967 | Minor | 254/134.3 |
| 3,819,154 | 6/1974 | Miller | 182/14 |
| 3,853,304 | 12/1974 | Jackson | 254/134 PA X |
| 4,163,480 | 8/1979 | Highland | 182/14 |
| 4,584,829 | 4/1986 | Heinke | 57/1 UN |

*Primary Examiner*—Daniel P. Stodola
*Assistant Examiner*—William Stryjewski
*Attorney, Agent, or Firm*—Cushman Darby & Cushman

[57] ABSTRACT

A method of using an apparatus for unwrapping tangled, high voltage subconductors. The apparatus includes sheaves that hold each subconductor. Each subconductor is disposed in a gap between an upper and lower sheave. The invention can accommodate either two parallel subconductors, three subconductors arranged in a triangular formation, or a quad or rectangular arrangement. Once installed on the subconductors, the device is moved along the line so as to unwrap the subconductors.

5 Claims, 3 Drawing Sheets

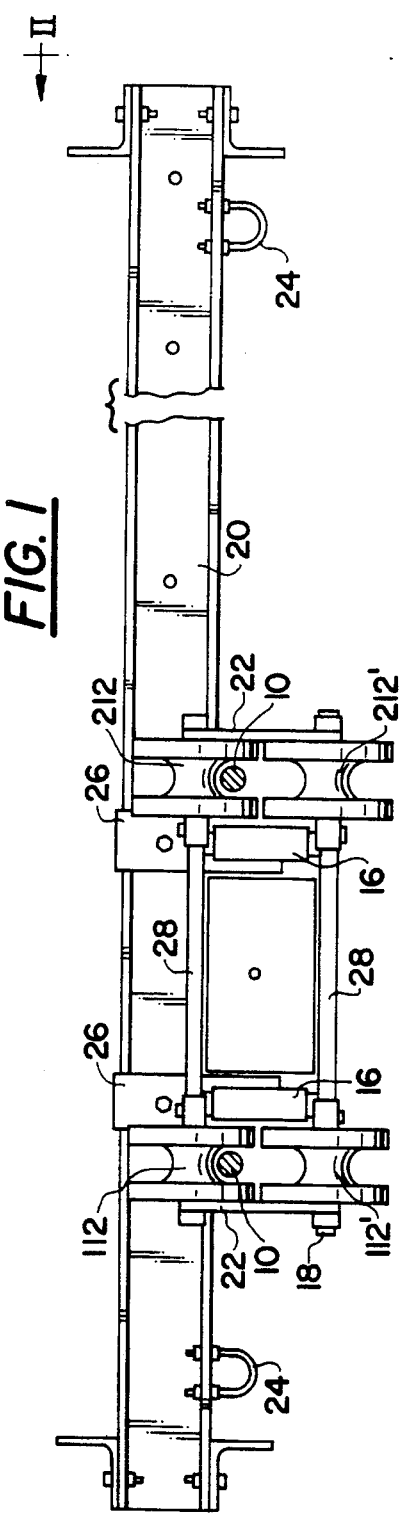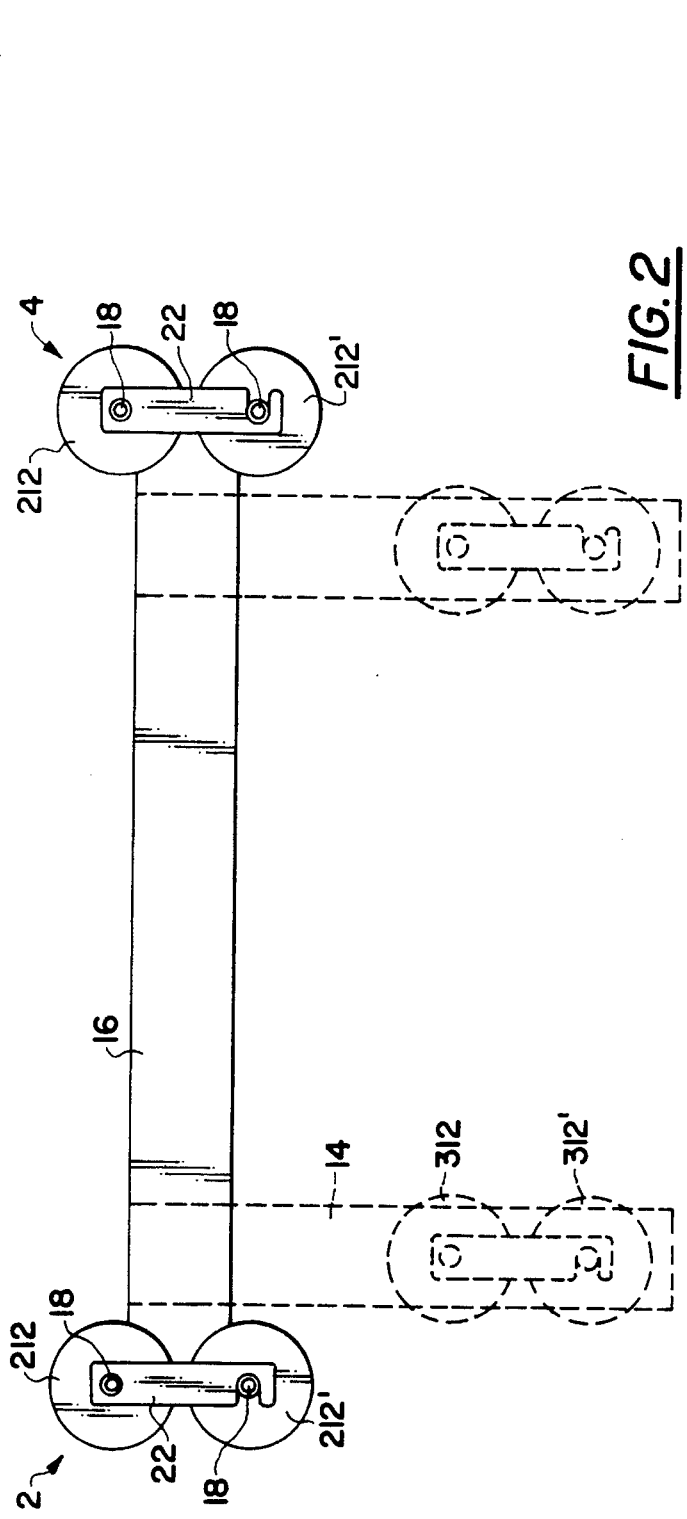

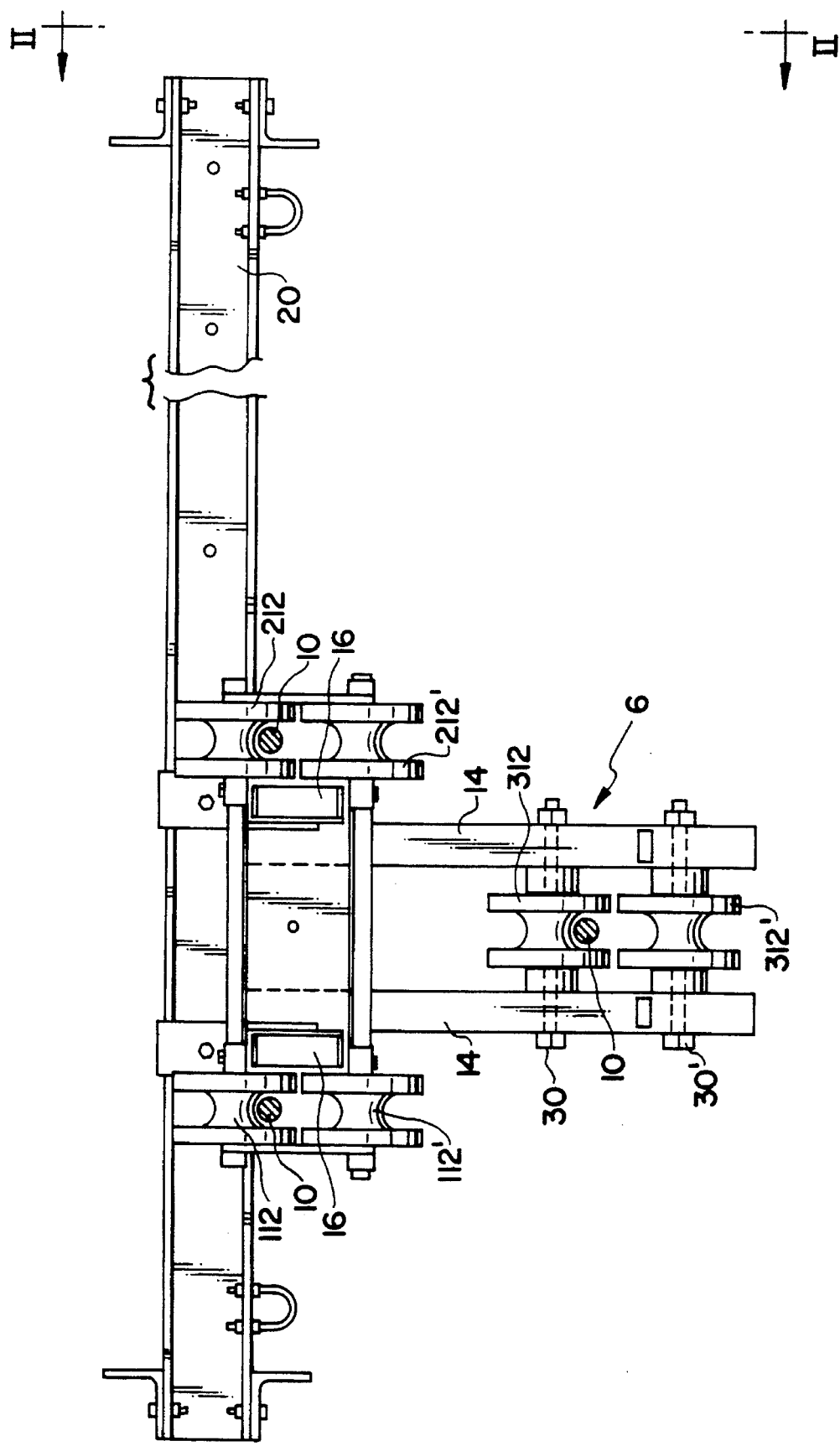

5,456,074

METHOD FOR UNWRAPPING SUBCONDUCTORS

This is a continuation of application Ser. No. 07/892,116, filed on Jun. 2, 1992, which was abandoned.

BACKGROUND OF THE INVENTION

1. Field of the Invention

This invention relates to a device for and a method of unwrapping conducting cables that have become entangled due to the wind, weather or cable breakage. More particularly, this device is directed at unwrapping energized, high voltage conductors in rough, mountainous terrain.

2. Description of the Prior Art

High voltage conductors are often suspended through rough, mountainous terrain, where the distance between towers can reach and exceed 3600 feet. Along these spans, the conductors are often subjected to high winds that cause conductor movement, which is sometimes considerable. The conductors are generally organized in a bundle, which can be configured as two parallel subconductors, a triangular arrangement of subconductors or a square or quad arrangement.

Due to the stresses imparted to the conductors by severe conditions, such as high winds, the spacers that separate the subconductors can break. When such breakage of spacers occurs, it is possible for the subconductors to become entangled or wrapped around one another. If such a condition is not rectified immediately, the conductors can be damaged mechanically, thus causing a conductor failure. A conductor failure can lead to a series of tower failures, as the towers which support such long spans of conductors are not constructed to tolerate conductor failures. This can lead to power outages or interruptions in power supply. Because people and industries depend on the continuous supply of power, it is desirable to avoid power interruptions, and especially desirable to avoid prolonged power outages.

Known methods of disentangling the subconductors involve the use of getting a bucket truck or crane to the tangled subconductors so that a utility worker can service the conductors. However, this method of untangling conductors is often difficult because, as mentioned above, the spans of the conductors often exceed 3600 feet. Sometimes these spans go over lakes, rivers or mountain ravines. It is nearly impossible to get a utility worker in a bucket to such positions.

No known prior art is directed to a solution for such a problem. However, multiple cable blocks, such as that disclosed in U.S. Pat. No. 3,819,154 to Miller are known. Multiple cable blocks are used to string a number of aerial cables at the same time. Such a cable block is directed at stringing telephone, CATV or the like. However, such cable blocks do not contemplate use with high voltage power lines, which can carry 100 kV or more. The rollers used in the cable block of Miller each support a cable 54 as illustrated in FIG. 9 of that patent. There is no provision for any mechanism for trapping the subconductors or cables between rollers or sheaves.

Two patents to Highland, U.S. Pat. No. 3,702,124 and U.S. Pat. No. 4,163,480, are directed to line travelling skips. However, such a device is meant only to carry utility workers along power lines and to skip over hardware attached to the line. These skips do not contemplate capturing tangled subconductors and unravelling them.

SUMMARY OF THE INVENTION

It is an object of the present invention to overcome the above noted deficiencies of the prior art by providing a device that can be pulled along power lines to unwrap tangled subconductors.

The foregoing and other objects of the invention are realized by providing a device that includes two rollers or sheaves for each subconductor. The device is attached to the conductors at a tower. When the device is attached, each subconductor of the conductor arrangement is fixed between its respective pair of sheaves. The device is pulled by a utility worker, who travels in front of the device in an aerial cart. The device may also be pulled by personnel on the ground or by an all terrain vehicle. This is achieved by attaching a non-conducting rope made of nylon, propylene or polydacron to the front of the device while the other end of the rope is pulled from the ground. The utility worker will remove the broken spacer members and pull the device along the conductors, unwrapping the subconductors as it travels.

The apparatus for unwrapping a plurality of tangled, high voltage subconductors, according to the present invention includes a first means for isolating each subconductor and trapping each subconductor away from other subconductors and means for allowing the first isolating means to rotationally move along the plurality of subconductors in response to an external force. Further, the device also includes means for permitting the external force to be applied to the apparatus and an extension member having a first end and a second end, with the first isolating and trapping means disposed at the first end, a second isolating and trapping means disposed at the second end and the permitting means disposed halfway between the first and second ends.

The method for unwrapping tangled, high voltage subconductors, according to the present invention includes the steps of identifying a configuration of subconductors and providing an apparatus matched to the configuration for unwrapping the subconductors. Any broken hardware, such as spacers, found along the subconductors is removed, and then the apparatus is moved along the subconductors, thereby unwrapping the subconductors. Once the subconductors are unwrapped, the device is removed from the subconductors and new spacers can be installed.

Other objects features and characteristics of the present invention, as well as the methods of operation and function of the related elements of the structure, and to the combination of parts and economies of manufacture, will become apparent upon consideration of the following detailed description and the appended claims with reference to the drawings, all of which form a part of this specification.

BRIEF DESCRIPTION OF THE DRAWING

In the drawings, like reference numerals designate corresponding parts in the various figures. The invention is shown in the attached Figures, which FIG. 1 is a front view of the present invention used for parallel subconductors;

FIG. 2 is a side view of the device shown in FIG. 1 taken along line II—II with the pull beam 20 not shown and with a third unwrapping assembly shown in dashed lines, being a side view of the device of FIG. 3;

FIG. 3 is a front view of a second embodiment of the present invention used for a triangular configuration of subconductors.

DETAILED DESCRIPTION OF THE PRESENTLY PREFERRED EXEMPLARY EMBODIMENT

Figure 4:
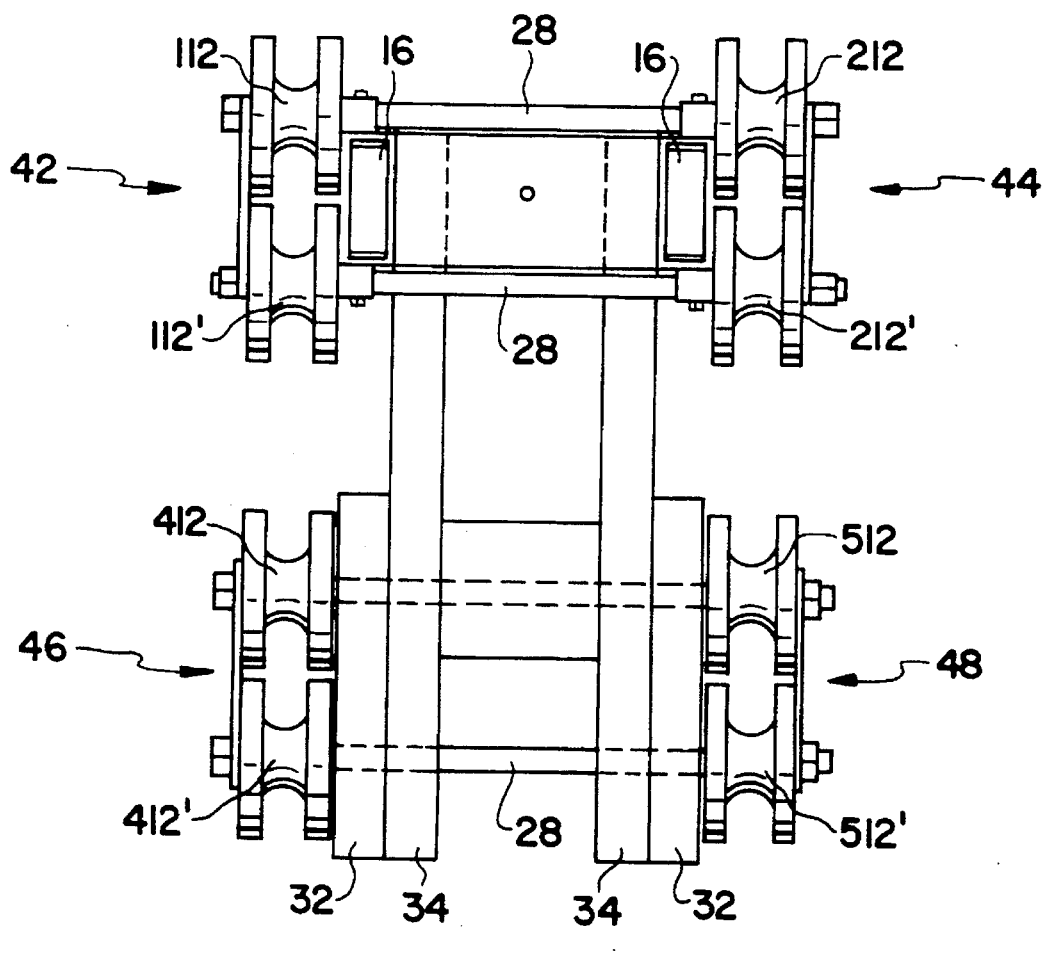
FIG. 4 is a front view of a third embodiment of the present invention used for a quad configuration of subconductors.

The present invention will be described with reference to FIGS. 1–4, all of which illustrate embodiments of the present invention.

FIG. 1 illustrates the present invention in a configuration used to unwrap two parallel subconductors 10, 10. Each subconductor 10 is disposed between two sheaves, upper sheave 112 and lower sheave 112'. Lower sheave 112' is disposed below sheave 112 such that there is a gap therebetween for subconductor 10. A normal size for sheaves 112, 112' is about six inches in outer diameter. There is only a small amount of "play" of the subconductor 10 when positioned between the sheaves 112, 112'. Each sheave 112, 112' has a corresponding sheave 212, 212' respectively, rotatably mounted to the opposite end of each axle 28. Moveable washer/nut assembly 18 holds the sheaves to each axle 28. The sheaves are preferably made of aluminum, with the remaining parts of the assembly made of an insulating material such as fiberglass. The distance between a center of right sheave 212 and left sheave 112 is about 18 inches, but each axle 28 can be easily lengthened to fit different size assemblies of subconductors.

Each of axles 28 are mounted to mounting beam 16 that extends between front and rear sheave assemblies 2 and 4 (FIG. 2). Mounting beam 16 is preferably made of structural tubing, which is, for example, two inches by five inches in cross section. The space between sheaves 212, 212' is maintained substantially constant by sheave separators 22. Sheave separator 22 also serves as a safety strap, ensuring that the sheaves 212, 212' do not accidentally separate, thereby allowing subconductors 10 to slip from the space between the sheaves.

Attached to mounting beam 16, substantially halfway between front sheave assembly 2 and rear sheave assembly 4, is pull beam 20. Pull beam 20 is also preferably made of an insulating material such as fiberglass. A rope (not pictured) may be attached to fasteners 24 disposed along the length of pull beam 20. This allows a utility worker to achieve variable levels of leverage.

FIG. 2 illustrates the structure shown in FIG. 1, in a view taken along line II—II. Pull beam 20 has been omitted for clarity. The dashed lines in FIG. 2 represent a third unwrapping assembly, thus being a side view of the second embodiment shown in FIG. 3. In FIG. 3, there are three sets of sheaves 112, 112'; 212, 212'; and 312, 312'. Third sheave assembly 6 includes sheaves 312, 312'. Sheaves 312, 312' of third sheave assembly 6 are rotatably mounted to third sheave support 14 via axles 30, 30' respectively. Axles 30, 30' extend through sheaves 312, 312' that make up the third sheave assembly 6.

Note that in FIG. 2, third sheaves supports 14 extend from both the front of mounting beam 16 and the rear thereof. The side view of FIG. 3, shown with the dashed lines in FIG. 2, is similar to a side view of the quad arrangement shown in FIG. 4. The one difference between the two side views is that extending blocks 32 are present in the quad arrangement.

In a quad arrangement, as depicted in FIG. 4, it is desirable to have left, upper sheave assembly 42 aligned directly above left, lower sheave assembly 46. It is also desirable to have right, upper sheave assembly 44 aligned directly above right, lower sheave assembly 48. Such alignment of the upper and lower sheaves allows the unwrapping apparatus to accept the quad arrangement of conductors 10 (not shown). Upper sheave assembly 42 includes sheaves 112,112'. Upper sheave assembly 44 includes sheaves 212 and 212'. Lower sheave assembly 46 includes sheaves 412, 412'. Lower sheave assembly 48 includes sheaves 512,512'. To make the lower sheaves align with the upper sheaves, extending blocks 32 are interposed between the lower sheave assemblies and the quad sheave supports 34. Quad sheave supports 34 extend downward in the same manner that third sheave supports 14 extend downward.

FIG. 4 is also shown without pull beam 20, but such a beam may be attached to the quad assembly so as to provide a connection for fasteners 24. Thus, the quad assembly of FIG. 4, like the parallel assembly of FIG. 1 and the triangular assembly of FIG. 3 is meant to be pulled along the subconductors 10 so as to unwrap them.

The method of unwrapping the subconductors will now be described. The first step in unwrapping subconductors is to determine the configuration of subconductors to be unwrapped, i.e. parallel, triangular or quad, and then choose the matching unwrapping apparatus. The selected device is then attached to the subconductors at the nearest utility tower by assembling the device around the subconductors.

A utility worker in a basket travels along the conductors ahead of the unwrapping apparatus. The utility worker removes separators and pulls the unwrapping apparatus by a rope attached to a fastener 24. The subconductors are caught between sheaves of one of the assemblies pictured in FIGS. 1, 3 and 4. As the unwrapping assembly is pulled along the subconductors, the subconductors are unwrapped. Once the subconductors are unwrapped, the utility worker can position new separators in place of the broken ones. After unwrapping the subconductors, the apparatus is removed from the conductors.

This invention has been described in connection with parallel, triangular and quad arrangements of subconductors. However, it is well within the knowledge of one of ordinary skill in the art to fit other arrangements of subconductors other than those described above.

While the present invention has been described in connection with what are presently considered to be the most practical and preferred embodiments, it is to be understood that the invention is not to be limited to the disclosed embodiments, but is intended to cover various modifications and equivalent arrangements included within the spirit and scope of the appended claims.

I claim:

1. A method for unwrapping tangled, high voltage, energized subconductors, comprising the steps of:

identifying a configuration of the energized subconductors;

providing an apparatus matched to the configuration for unwrapping the energized subconductors, the apparatus including means for engaging and isolating each energized subconductor from other subconductors, the engaging and isolating means including a first sheave element having a concave surface and a second sheave element having a concave surface, said concave surface of said first sheave element being opposed to said concave surface of said second sheave element with each of the plurality of energized subconductors being trapped in a space defined by the concave surfaces;

removing any broken hardware from the energized subconductors;

moving the apparatus along the energized subconductors, thereby unwrapping the subconductors; and removing the apparatus from the energized subconductors.

2. A method as claimed in claim 1, wherein each subconductor is disposed between an upper and lower sheave disposed at a first end of the apparatus and at an upper and lower sheave disposed at a second end of the apparatus, wherein said moving step includes slidably moving the apparatus along the subconductors via rotation of the sheaves.

3. A method as claimed in claim 1, wherein said moving step includes imparting an external force to said apparatus so as to cause said apparatus to move along the subconductors.

4. A method as claimed in claim 1, wherein said providing step includes providing an apparatus to accommodate one of a parallel subconductor arrangement, a triangular subconductor arrangement and a quad or rectangular subconductor arrangement.

5. A method for unwrapping tangled, bare, transmission-class voltage, energized subconductors of the same electrical phase, comprising the steps of:

identifying a configuration of the energized subconductors of the same electrical phase;

providing an apparatus matched to the configuration for unwrapping the energized subconductors of the same electrical phase, the apparatus including means for engaging and isolating each energized subconductor from other subconductors, the engaging and isolating means including a first sheave element having a concave surface and a second sheave element having a concave surface, said concave surface of said first sheave element being opposed to said concave surface of said second sheave element with each of the plurality of energized subconductors of the same electrical phase being trapped in a space defined by the concave surfaces;

removing any broken hardware from the energized subconductors of the same electrical phase;

moving the apparatus along the energized subconductors of the same electrical phase, thereby unwrapping the subconductors; and removing the apparatus from the energized subconductors of the same electrical phase.

* * * * *